March 8, 1966  R. G. BALE  3,238,728
ACCURATE CONTROL MECHANISM FOR AN ACTUATING MEMBER
Filed Aug. 3, 1964
Fig. 1.
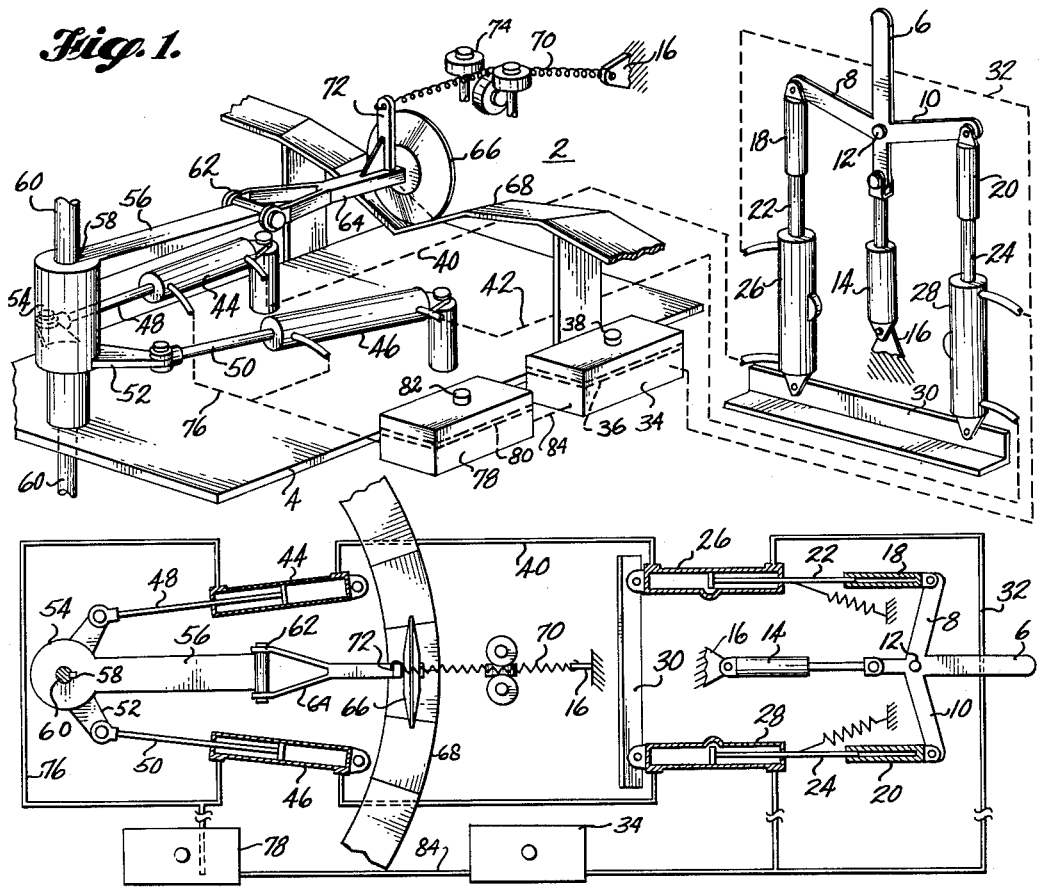
Fig. 2.
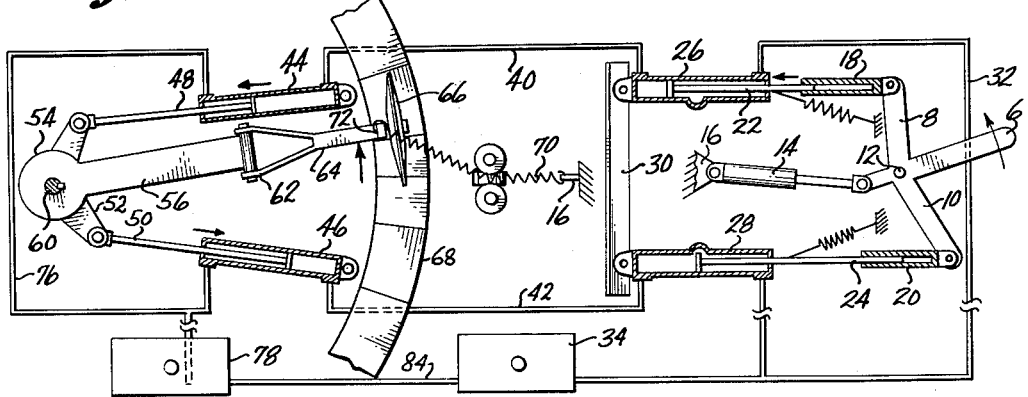
Fig. 3.
INVENTOR.
ROBERT G. BALE
BY Robert G. Bale 村
United States Patent Office 3,238,728
Patented Mar. 8, 1966

3,238,728
ACCURATE CONTROL MECHANISM FOR AN ACTUATING MEMBER
Robert G. Bale, 16204 27th S., Seattle, Wash.
Filed Aug. 3, 1964, Ser. No. 386,956
8 Claims. (Cl. 60—54.5)

This invention relates to a control mechanism for an actuating member and more particularly to an accurate control of an actuating member used in relationship with heavy duty machinery such as winches or the like.

In operating heavy duty machinery such as winches, etc., the shifting of an actuating member or shaft for controlling a change from a low to a high speed or for the control of reverse to forward rotation of a drum or any other rotating mechanism is normally arranged by manual control of a handle having a two-way position and a center position there in between.

However, it was found that this shifting mechanism is inaccurate because the absolute neutral center position is difficult, if not impossible, to obtain by the operator.

Another problem in the prior art is the danger involved when an actuating member or shaft is moved in a certain position by a lever or handle and that this handle will not return to a non-actuating position in case of accidental slipping or loss of control of this handle by the operator.

It is therefore an object of the present invention to provide an accurate control mechanism for an actuating member.

A further object of the present invention is to provide a control mechanism with an absolute neutral position.

Another object of the present invention is to provide an easy and simple control mechanism for positioning an actuating member in a certain position.

An additional object of the present invention is to provide a shifting mechanism with an absolute neutral center position in between a two-way operating position for an actuating member and automatic means to return the actuating member to the neutral center position in case of accidental loss of control of the shifting mechanism by the operator.

An object of the invention is to provide hydraulic components which are arranged to avoid the entrapment of air which might otherwise result upon elevation changes of such components mounted on vehicles and vessels which pitch and roll.

An object of this invention is to provide a manual control which is very accurate in transmitting and withdrawing manually produced hydraulic forces to obtain substantially 100% accuracy in its overall control function.

Other objects of the invention will be apparent from the following description of a preferred and practical embodiment of the invention when taken in conjunction with the drawings which accompany and form part of this specification and wherein:

FIGURE 1 is shown an isometric illustration of the accurate control mechanism for an actuating member. For reasons of simplicity and in order to keep a clear showing of the mechanism, fluid line connections are schematically illustrated by short dash lines.

FIGURE 2 is a schematic plan view of the invented mechanism in its absolute neutral center position and wherein the actuators are shown in a horizontal open section view.

FIGURE 3 is a same schematic plan view of the invented mechanism as shown in FIGURE 2; however, in an operating position and thus showing the various different positions of several items in comparison with FIGURE 2.

In general this present invention provides an accurate neutral center positioning device for an actuating member which has two or more operating positions on each side of its neutral position. Furthermore, the neutral center position device is provided with load pulling means to enable the actuating member when being in an operating position to return to its center position if manual control, which indirectly operates the neutral center position device, is lost.

Referring now to the drawings, wherein like reference characters designate corresponding parts throughout the several views, there is shown in FIGURE 1 in isometric fashion the accurate control mechanism 2 installed on a platform 4. A manual shifting handle 6 having side arms 8 and 10 is pivotally mounted by pivot means 12 and further pivotally mounted and sustained for vibration and damping by a shock absorber means 14 which in turn is pivotally mounted to ground or environmental frame work 16. A sleeve 18 and 20 are pivotally mounted to arms 8 and 10 respectively of the manual shifting handle 6. Freely moving piston rods 22 and 24 are slidably arranged in the sleeves 18 and 20 respectively and slidably fluid tight mounted in one-way by-pass actuators 26 and 28 respectively. The by-pass actuators 26 and 28 are pivotally mounted to frame means 30 and hydraulically connected by fluid lines 32 to a fluid container 34, having a float 36 and vent means 38 on one side, and by fluid lines 40 and 42 to actuators 44 and 46 respectively, on the other side. The actuators 44 and 46 are pivotally mounted to the frame means 4 and provided with slidable piston members 48 and 50 respectively which are pivotally mounted to V shaped member 52. The V shaped member 52 has an integral sleeve 54 on which is integrally mounted an elongated bar 56. The inside of the sleeve 54 is fixedly connected by fastening means 58 to the actuating member or shaft 60. The shaft 60 is shown, in FIGURE 1 and FIGURE 2, in its neutral position, however, is adapted to be rotated more than 90° in each direction from the 0° or neutral position. The bar 56 is provided with hinge means 62 which connects pivotally an arm member 64 having a roller or wheel 66 rotationally mounted at the end of the arm member 64. This roller 66 is adapted to travel on an inclined guiding member having optional steps provided therein, however, in the neutral position of the mechanism the roller 66 will rest in a perfect position, between the two inclined paths of the guiding member 68, and thus has to overcome a certain inertia in order to move.

Besides the inertia and upwards traveling of the roller 66 in either direction on the guiding member 68 there is a return load connected to the arm member 64 pulling the roller 66 towards the center position on the guiding member 68.

This load may be provided by extension spring means 70 connected between the frame work 16 and a bracket 72 operably and adjustably (not shown in the drawings) mounted on the arm member 64. Aligning means 74 are positioned between the frame work 16 and the bracket 72 and are intended to keep the spring means 70 in a predetermined alignment with respect to the arc of traveling of roller 66.

The hydraulic circuit is further completed by a fluid line connection 76 from the actuators 44 and 46 to a container 78, having a float 80 and vent means 82 provided therein.

The containers 34 and 78 are connected with one another by an interconnecting line 84. Container 34 is located at an elevation above the hydraulic system comprising the actuators 44 and 46, and the container 78 is located at an elevation above the hydraulic system comprising actuators 26 and 28.

Having thus described the different parts and their function by reference numbers, the operation of the mechanism is as follows:

As shown in FIGURE 1, the accurate control mechanism 2 is mounted on a platform 4 and is remotely controlled by manual shifting of the handle 6.

Assuming that the mechanism 2 is in the neutral position as shown in FIGURE 1 and FIGURE 2, and that it is required that a certain operation of an apparatus (not shown) connected to the actuating member or shaft 60 is to be accomplished, the operator would then move the handle 6 in a certain direction. So far there is no fluid movement because each part is in a neutral inoperative position. However, as soon as the operator moves the handle 6 in a direction as shown in FIGURE 3 (see arrow handle 6), the handle 6 will pivot on pivot means 12, which movement is smooth and any associated environmental vibration is damped by the unique fastening of the handle 6 through its shock absorber means 14 connected therewith. The side arm 8 of the handle 6 will move in a downward direction (see arrow FIGURE 3) and thereby moving piston rod 22 in the by-pass actuator 26 thus displacing fluid through fluid line 40. The side arm 10 of the handle 6 will move in an upward direction and the sleeve 20 will move likewise thus leaving the piston rod 24 undisturbed, so that the by-pass actuator 28 cannot act as an actuator and thus can be compared as being considered a free flow-through valve.

The displaced fluid through fluid line 40 which was moved by the action of the piston rod 22 of the by-pass actuator 26, will initiate a movement of the piston member 48 of the actuator 44, as shown in FIGURE 3, by the direction of the arrow located along side of the actuator 44.

The V shaped member 52, which is integrally connected with the sleeve 54 and bar 56 will rotate the fixedly connected actuating member or shaft 60 a certain amount of degrees, and thus the desired performance of the apparatus (not shown) connected with the actuating member or shaft 60 will be activated. At the same time that the piston member 48 was moved by the fluid in line 40 it will also move fluid through fluid line 76 towards the container 78. A substantial equal amount of fluid will leave the container 78, by the suction power of piston member 50. Piston member 50 will move in the direction indicated by the arrow shown along side of the actuator 46 in FIGURE 3, the movement of the piston member 50 is created by the rotation of the V shaped member 52 through the fixed connection with the actuating member or shaft 60. When the piston member 50 of the actuator 46 moves in the direction of the arrow it will move fluid through the line 42 and this fluid will further move through the by-pass actuator 28 which acts as being a free flow-through valve as was explained before.

This fluid then will return to the container 34 while simultaneously a substantial equal amount of fluid will move from the container 34, to the by-pass actuator 26 through the suction power of its piston rod 22 which was moved in the direction of the shown arrow by the actuation of the handle 6 as was mentioned before.

The two containers 34 and 78 are each provided with a float 36 and 80 respectively and vent means 38 and 82 respectively. The reason for this float and vent arrangement will be obvious when the entire mechanism would be used in a non-horizontal plane or better when the entire accurate control mechanism 2 would be installed on a moving vehicle such as a ship, barge, etc. Also it should be understood that container 34 is installed in an elevated position with respect to the hydraulic system mounted on platform 4 and that the container 78 is also mounted at an elevated position above the hydraulic system connected with the frame means 30. Such positioning of these hydraulic reservoirs or containers 34 and 78 above their respective actuators and their resulting spacing from one another substantially avoids the unwanted entrapment of air within the hydraulic lines at all times, even during abnormal changes of environment, such as rolling of a ship. If two containers are not used, the selection of the location of a single one is often very difficult or not feasible on moving, rolling and pitching vehicles and vessels.

Referring back to the rotation movement of the V-shaped member 52 which rotation was indirectly created by the movement of the handle 6 in the direction shown in FIGURE 3, then it will be easy to understand that the bar 56 and attached arm member 64 with rotating roller 66 will move likewise and that rotating roller 66 thus moves along the inclined path formed by the guiding member 68. As long as the handle 6 is kept in its displaced position, the roller 66 will stay on a certain point of the path of the guiding member 68, however, a release of the handle 6 will return the handle 6 to its center position, which return action is accomplished through the load pulling the roller 66 to the detent of the guiding member 68. The total load moving the roller 66 to the detent section of the guiding member 68 is the sum of the gravity of the roller 66 hinged by the arm member 64 and the pulling or contracting force of the spring means 70, thus accurately moving the actuating member or shaft 60 back into the perfect center or neutral position. A swinging or oscillating action of the handle 6 is nearly impossible and nullified by the retarded return motion of the roller 66 through the indirect opposing action of handle 6 through its shock absorber means 14 and the return of roller 66 into the detent of guiding member 68.

Assuming the very slight amount of rotation of the actuating member or shaft 60 is required, it will be simple just to move the handle 6 slightly from its neutral position which is one of the major problems in the prior art in the control of the operating mechanism of winches and the like. Explanation of an assumed movement of handle 6 to the opposite direction as shown in FIGURE 3, is deemed to be not necessary in view of the explained procedure to one direction as described above. It is understood that the construction as shown herein where a hydraulic circuit is used for actuating the various parts, a mechanical or electrical system could be incorporated as a replacement of the hydraulic circuit, but such a replacement will be obvious in the art as shown herein and thus does not change the novel inventiveness of the present invention.

Although various minor structural modifications might be suggested to the preferred embodiment herein described by way of illustrative example only it should be understood that many changes could be effected to exemplary structures herein described without departing from the spirit of the present invention and accordingly, it should be further understood that the inventor wished to enclose within the scope of the patent warranted hereon all such modifications as reasonably and properly come within the scope of the inventor's contribution to the art.

I claim:
1. Apparatus for accurate control of the center positioning of a two direction rotating actuating member, comprising:
 (a) reference frame means;
 (b) driving means on the reference frame means adaptable for movement by personnel;
 (c) actuating means connected both to the driving means and reference frame means and moved by the driving means;
 (d) center positioning means mounted both on the reference frame means and actuating member, and adapted to restrain the turning of the two direction rotating actuating member from its center position; this center positioning means comprising, in turn;
  (1) guiding means with elevation changing surfaces on both sides of a neutral central portion secured to the reference frame means; and
  (2) follower means secured to the actuating member and adapted to move on the guiding means to create a restraining force tending to return the actuating member to a neutral position cor- responding to the neutral central portion of the guiding means.

2. Apparatus for accurate control of center positioning of a two direction rotating actuating member, as claimed in claim 1, wherein a return load means is positioned between the reference frame means and the follower means to cause the return of the follower means to the neutral central portion of the center positioning means and thereby also cause the return of the two directional rotating actuating member to its own central position.

3. Apparatus for accurate control of center positioning of a two direction rotating actuating member, as claimed in claim 1, wherein the elevation changing surfaces of the guiding means are a pair of inclined portions meeting to form a neutral central portion.

4. A centering control system for operating a control shaft for winches and the like, comprising in combination:
 (a) a two-way pivotally mounted handle having an elongated member substantially perpendicularly mounted thereon and in such a way that said elongated member ends eject away from said handle;
 (b) said member ends provided with pivotally mounted sleeve members;
 (c) a pair of one-way by-pass actuators each having a piston rod slidably engaged in each of said sleeve members whereby one of said by-pass actuators will be activated when said sleeve member is moved in a direction towards said one by-pass actuator by pivoting said handle to a certain direction thus creating a compressing force in said one by-pass actuator;
 (d) each of said one-way by-pass actuators hydraulically connected with a two-way actuator and each of said two-way actuators provided with a piston member slidably arranged therein;
 (e) a V shaped member substantially perpendicularly mounted to the control shaft and connecting pivotally each of said piston members of said two-way actuators at each of said V shaped member ends, so that when one of said two-way actuators receive said compressing force said piston member of said one actuator will move said control shaft into a certain rotational direction;
 (f) a flexible member mounted substantially perpendicularly with the shaft on one end and having a roller rotationally mounted in perpendicular relationship with said flexible member on its other end;
 (g) said roller adapted to ride over a certain inclined path comprising a horizontally orientated accurate shaped pair of opposing vertically inclined flat members extending from its center plane, when said shaft starts to rotate in a certain direction.

5. A central control system for operating a control shaft for winches and the like, as claimed in claim 4 wherein said flexible member which is generally horizontal is provided with a spring which is adapted to supply an opposing force to substantial horizontal movements of said flexible member.

6. A center control system for operating a control shaft for winches and the like as claimed in claim 4 wherein said pair of one-way by-pass actuators and said pair of two-way actuators are hydraulically connected in a circuit relationship interconnected by at least one container placed in an elevated position above said actuators, and opened to atmospheric pressure.

7. A center control system for operating a control shaft for winches and the like as claimed in claim 4 wherein said pair of one-way by-pass actuators and said pair of two-way actuators are hydraulically connected in a circuit relationship interconnected by two containers each placed in in elevated position above said actuators, and wherein said containers are provided with floating and vent means.

8. A manually initiated and manually energized remote mechanical and hydraulic control system for operating and positioning a control shaft of machinery such as a marine winch, comprising:
 (a) a reference mounting means;
 (b) a hand operated two directional control handle including two oppositely spaced attachment means and pivotally secured to the reference mounting means;
 (c) hydraulic actuator means secured both to the hand operated controls by the oppositely spaced attachment means and to the reference mounting means;
 (d) remote hydraulic actuator means secured to the reference mounting means and adapted to be secured to a control shaft of machinery;
 (e) hydraulic liquid supply and distributinon means secured to the reference mounting means and to both hydraulic actuator means with the liquid supply orientated to avoid entrapment of air upon elevation changes; and
 (f) a restraining and returning force creating assembly comprising an elongated cam of changing elevation having a central low neutral portion secured to the reference mounting means, and a following means adapted for attachment to a control shaft of machinery and to travel along the elongated cam always tending to return to the central low nuetral portion and thereby return a control shaft of machinery to a neutral position.

References Cited by the Examiner

UNITED STATES PATENTS

| | | | |
|---|---|---|---|
| 568,376 | 10/1896 | Brown | 60—54.5 |
| 867,282 | 10/1907 | MacFarren | 92—131 X |
| 962,257 | 6/1910 | Rockwell | 92—131 X |
| 2,624,533 | 1/1953 | Brader | 60—52 X |
| 2,859,592 | 11/1958 | Mercier et al. | 60—52 X |

FOREIGN PATENTS

| | | |
|---|---|---|
| 838,647 | 6/1960 | Great Britain. |

SAMUEL LEVINE, *Primary Examiner.*

ROBERT R. BUNEVICH, *Examiner.*